United States Patent [19]
Shaffer et al.

[11] Patent Number: 5,916,393
[45] Date of Patent: Jun. 29, 1999

[54] METHOD FOR APPLYING ADHESIVE ON A POROUS SUBSTRATE

[75] Inventors: Roy E. Shaffer, Granville; Jeffrey A. Tilton, Newark; Randall E. Nyhart, Granville; Frederick R. Ernest, St. Louisville, all of Ohio

[73] Assignee: Owens Corning Fiberglas Technology, Inc., Summit, Ill.

[21] Appl. No.: 08/881,787

[22] Filed: Jun. 24, 1997

[51] Int. Cl.$^6$ ................................. B32B 31/00
[52] U.S. Cl. .................. 156/82; 156/298; 156/497; 427/348
[58] Field of Search .............. 156/82, 298, 320, 156/321, 322, 497; 427/207.1, 208.2, 348

[56] References Cited

U.S. PATENT DOCUMENTS

| | | |
|---|---|---|
| 1,328,541 | 1/1920 | Palmer .................................. 427/348 |
| 3,507,733 | 4/1970 | Davidson . |
| 3,598,679 | 8/1971 | Ettre et al. . |
| 3,640,788 | 2/1972 | Flynn ..................................... 156/82 |
| 3,888,716 | 6/1975 | Morse . |
| 3,991,232 | 11/1976 | Kamiuchi et al. . |
| 4,013,812 | 3/1977 | Geiger . |
| 4,099,943 | 7/1978 | Fischman et al. ................... 156/82 X |
| 4,134,948 | 1/1979 | Baker, Jr. . |
| 4,151,319 | 4/1979 | Sackoff et al. . |
| 4,208,230 | 6/1980 | Magarian . |
| 4,311,745 | 1/1982 | Civardi ................................. 156/82 X |
| 4,430,147 | 2/1984 | Harston et al. . |
| 4,477,938 | 10/1984 | Rogut .................................. 156/82 X |
| 4,619,854 | 10/1986 | Penttinen . |
| 4,668,562 | 5/1987 | Street . |
| 4,722,857 | 2/1988 | Tomioka et al. . |
| 4,753,693 | 6/1988 | Street . |
| 4,764,234 | 8/1988 | Smits et al. . |
| 4,803,115 | 2/1989 | Fushiki et al. . |
| 5,104,701 | 4/1992 | Cohen et al. . |
| 5,106,447 | 4/1992 | Di Rado et al. . |
| 5,112,678 | 5/1992 | Gay et al. . |
| 5,123,453 | 6/1992 | Robbins . |
| 5,141,793 | 8/1992 | Fontanilla . |
| 5,234,520 | 8/1993 | McClintock . |
| 5,240,527 | 8/1993 | Lostak et al. . |
| 5,246,514 | 9/1993 | Alderman et al. . |
| 5,248,551 | 9/1993 | Kelman et al. . |
| 5,284,702 | 2/1994 | Umemoto et al. . |
| 5,298,318 | 3/1994 | Soules et al. . |
| 5,300,165 | 4/1994 | Sugikawa ............................ 156/150 |
| 5,316,604 | 5/1994 | Fell ........................................ 156/82 |
| 5,359,735 | 11/1994 | Stockwell . |
| 5,359,739 | 11/1994 | Rains . |
| 5,389,167 | 2/1995 | Sperber . |

FOREIGN PATENT DOCUMENTS

| | | |
|---|---|---|
| 0 629 153 B1 | 10/1996 | European Pat. Off. . |
| 6158004 | 11/1992 | Japan . |
| 1520779 | 8/1978 | United Kingdom . |

OTHER PUBLICATIONS

Nordson Corporation, Nordson®, Hot Melt Spray Guns., 1990.

*Primary Examiner*—James Engel
*Attorney, Agent, or Firm*—Stephen W. Barns

[57] ABSTRACT

A method for applying adhesive on a porous substrate with improved bonding between the adhesive and the substrate. The adhesive is applied on a surface of the substrate. The applied adhesive is impinged with a fluid such as air to force a first portion of the adhesive to flow and penetrate the substrate while a second portion of the adhesive remains on the surface.

18 Claims, 5 Drawing Sheets

METHOD FOR APPLYING ADHESIVE ON A POROUS SUBSTRATE

TECHNICAL FIELD AND INDUSTRIAL APPLICABILITY OF THE INVENTION

This invention relates in general to a method for applying adhesive on a surface of a porous substrate, and more particularly, to a method for improving the bond strength between the adhesive and the substrate. The invention can be useful in the production of fibrous insulation products such as peel and stick insulation products.

BACKGROUND OF THE INVENTION

Fibrous insulation products are often used in heating, ventilating and air conditioning units, and in appliances such as dishwashers, refrigerators and freezers. The insulation product is usually installed inside the metal housing of the device to reduce the transmission of heat and sound. The insulation product may be attached to the inner surface of the housing by the use of tape, film or adhesive. However, tapes and films are not always effective in providing good adhesion between the insulation product and the housing.

Further, traditional methods of applying adhesive on a porous substrate such as fibrous insulation generally do not provide a strong bond between the adhesive and the substrate. The adhesive adheres only to weakly bound surface fibers and dust, and consequently the interfacial bond between the adhesive and the fibrous insulation is weak.

The prior art does not adequately address this problem. For example, U.S. Pat. No. 5,106,447 to Di Rado et al. discloses a hot melt adhesive composition for bonding an insulation assembly to a heating, ventilating or air conditioning (HVAC) unit. The adhesive is applied by spraying it onto the unit being insulated, or onto the insulation assembly. It has been found that such spray application of hot melt adhesive does not result in a strong bond between the HVAC unit and the insulation assembly because the adhesive only bonds to the top surface of the insulation assembly and the insulation assembly tends to delaminate as a result when force is applied thereto. There is no suggestion of any method other than spraying for applying the adhesive.

U.S. Pat. No. 4,134,948 to Baker, Jr. discloses a nonwoven fabric for use in industrial and household wipers. An adhesive is sprayed on one surface of the fabric, and a partial vacuum is applied on the opposed surface to saturate the fabric with adhesive. The saturated fabric is conveyed through an oven to cure the adhesive. The adhesive is thus a thermoset adhesive, as opposed to a hot melt adhesive which is thermoplastic. There is no suggestion of impinging the adhesive with a fluid, and no suggestion of leaving a portion of the adhesive on the surface of the fabric.

Accordingly, it would be desirable to provide a method for applying adhesive on a porous substrate that improves the bond strength between the adhesive and the substrate. It would particularly be desirable to provide a method for applying a pressure sensitive adhesive on a fibrous insulating material to make a convenient peel and stick insulation product.

SUMMARY OF THE INVENTION

The above objects as well as other objects not specifically mentioned are accomplished by a method for applying adhesive on a porous substrate such as a fibrous insulating material. The method provides an improved bond between the adhesive and the substrate. The adhesive is applied on a surface of the substrate, preferably by extruding the adhesive in the form of ribbons on the surface. Then, the applied adhesive is impinged with a fluid to force a first portion of the adhesive to flow and penetrate the substrate while a second portion of the adhesive remains on the surface.

DETAILED DESCRIPTION AND PREFERRED EMBODIMENTS OF THE INVENTION

The present invention relates to a method for applying adhesive on a surface of a porous substrate to improve the bond strength between the adhesive and the substrate. By "porous substrate", as used herein, is meant any substrate which is at least slightly porous to molten adhesive, or any substrate having an irregular surface so that molten adhesive can be forced into the irregular surface features (i.e., cracks and crevices). Preferably, the porous substrate is a fibrous substrate such as a fibrous insulating material or a fibrous mat. The fibers of the fibrous substrate can be made from a wide range of inorganic and organic materials, including minerals such as glasses, rock, slag and basalt, and thermoplastic materials such as polymers.

A fibrous insulating material can be formed by any conventional process. One fiber forming process is known as the rotary process, in which molten inorganic or organic material is placed into a rotating spinner which has orifices in the perimeter, and the material flows out the orifices to produce a downwardly falling stream of fibers. Another fiber forming process is a continuous or textile process in which fibers are mechanically pulled from the orificed bottom wall of a feeder or bushing containing molten inorganic or organic material. A sizing may be applied to the fibers to modify their properties.

The fibers from the rotary or continuous process may be impregnated with about 20% or less by weight of a binder, and typically between about 5% and about 10% by weight of a phenolic resin binder such as phenol-urea-formaldehyde. However, the fibrous insulating material may also be manufactured without a binder. The fibers are compressed to the desired density and the binder (if used) is cured to form the fibrous insulating material. Typically, the density of a fibrous glass wool insulating material ranges from about 0.5 pounds per cubic foot (8 kilograms/meter$^3$)

to about 10.0 pounds per cubic foot (160 kilograms/meter$^3$). Preferred fibrous glass wool insulating material for many applications is commercially available from Owens Corning, Toledo, Ohio.

A fiber board insulating material such as glass fiber board can also be used as the fibrous substrate. The glass fiber board is formed from glass fibers and impregnated with binder, and compressed to a relatively high density between about 6 pounds per cubic foot (96 kilograms/meter$^3$) and about 28 pounds per cubic foot (448 kilograms/meter$^3$). The glass fiber board is a more rigid, board-like insulating material than the lower density fibrous glass wool insulating material described above.

The fibrous substrate can also be a fibrous mat such as a glass fiber mat. The glass fiber mat is typically made from chopped glass fibers held together by a polymer binder. It can be manufactured using conventional glass fiber mat processing techniques known to those skilled in the art.

Figure 1:
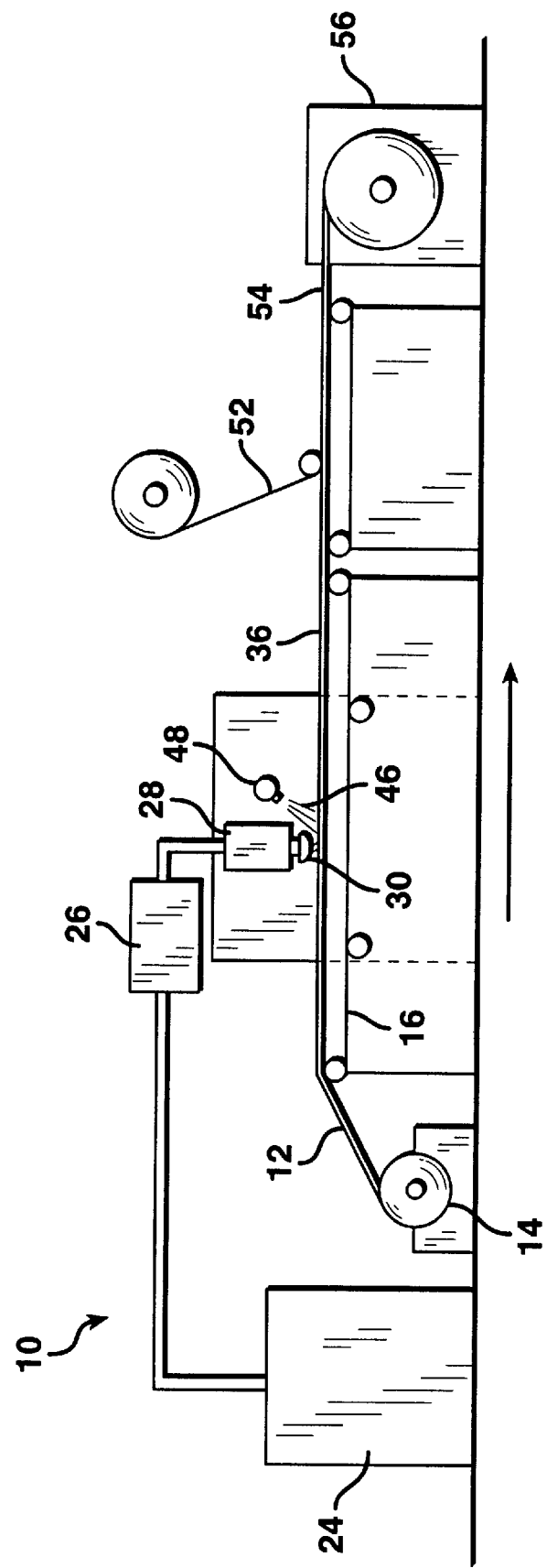
FIG. 1 is a schematic view of a process for producing a peel and stick fibrous insulation product, including a method according to the invention for applying adhesive on the insulation product.
Figure 2:
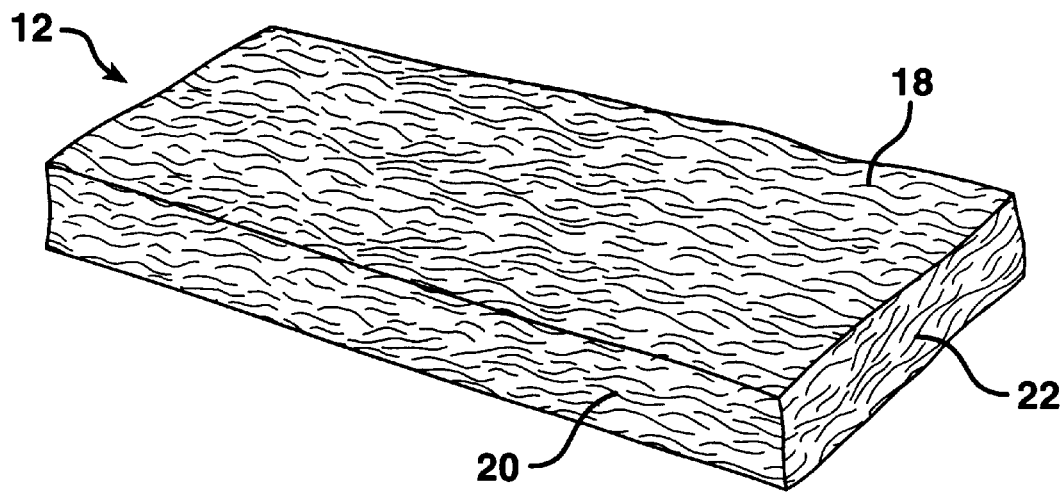
FIG. 2 is a perspective view of a batt of fibrous glass wool useful for producing the insulation product.

Referring now to the drawings, FIG. 1 illustrates a process line 10 for producing a peel and stick insulation product according to the present invention. A porous substrate such as a batt of fibrous glass wool 12 is fed from a roll 14 onto a conveyor 16. FIG. 2 illustrates a section of the batt of fibrous glass wool 12. The batt 12 has sufficient strength and integrity to support itself and remain intact during processing and installation. The batt 12 has an upper surface 18, a lower surface 20, and an interior portion 22 between the opposed surfaces. The upper and lower surfaces 18, 20 include weakly bound surface fibers.

A melter 24 supplies molten adhesive through a pumping station 26 to an adhesive applicator 28. The adhesive may be any adhesive material suitable for application on a porous substrate. Preferably, the adhesive is a thermoplastic adhesive such as those known for use on insulation products. The thermoplastic properties of the adhesive allow it to flow when heated and return to a solid or plastic state when cooled. A pressure sensitive adhesive such as a rubber-based adhesive is preferred for use in making peel and stick insulation products. More preferably, a pressure sensitive hot melt adhesive is used. A preferred pressure sensitive hot melt adhesive is a styrene isoprene block copolymer blended with C-5 feedstock hydrocarbon resin and C-9 reinforcing end block resin. Some other examples of suitable rubber-based hot melt adhesives are blends of styrenebutadiene rubber, polyisoprene and related dienes or olefin polymers, with suitable tackifiers such as those commercially available. Another suitable adhesive is an isostatic thermoplastic polybutene-1/ethylene copolymer wherein the ethylene content varies from about 5.5% to about 10% by weight of the copolymer.

The viscosity of the adhesive can be selected based on customer needs, and in general, the invention will work with any viscosity of adhesive. However, a high viscosity adhesive provides resistance to creep (gradual flow) in the final product at higher temperatures. Depending on the particular application, the adhesive preferably has a viscosity from about 5,000 centipoise to about 80,000 centipoise at 350° F. (177° C.), and more preferably from about 25,000 centipoise to about 60,000 centipoise. Reactive adhesives, which increase in viscosity over time, can also provide resistance to creep.

The adhesive may include flame retardants, dyes, antioxidants, or other additives or solvents known for use in adhesives.

The adhesive can be applied on the surface of the porous substrate by extruding, rolling, spraying, doctoring, brushing or other means. The adhesive is usually applied on the surface in an amount ranging from about 4 grams to about 20 grams per square foot (about 43 grams to about 215 grams per square meter), and preferably from about 9 grams to about 15 grams per square foot (about 97 grams to about 161 grams per square meter). Generally, the adhesive is applied in a thickness ranging from about 0.004 inch (0.1 millimeter) to about 0.03 inch (0.8 millimeter), depending on the nature of the substrate.

Preferably, a substantially even thickness of adhesive is applied on the surface of the porous substrate. An even thickness of adhesive contributes to good bonding between the adhesive and the substrate. If the adhesive is applied unevenly, relatively thin portions of the adhesive may cool too rapidly for good bonding.

Figure 3:
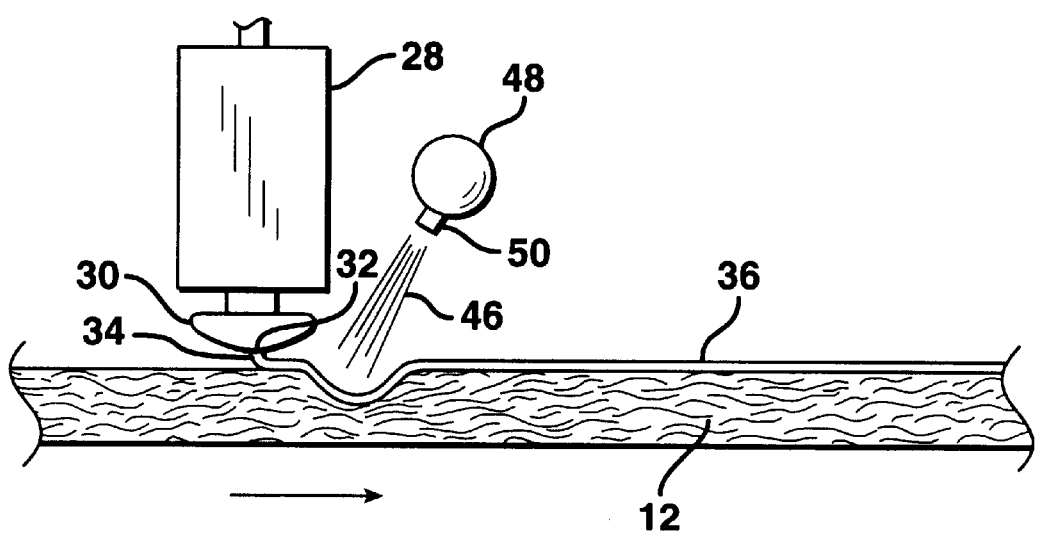
FIG. 3 is a schematic view of an adhesive applicator and an air head for applying adhesive on the batt of fibrous glass wool according to the invention.
Figure 6:
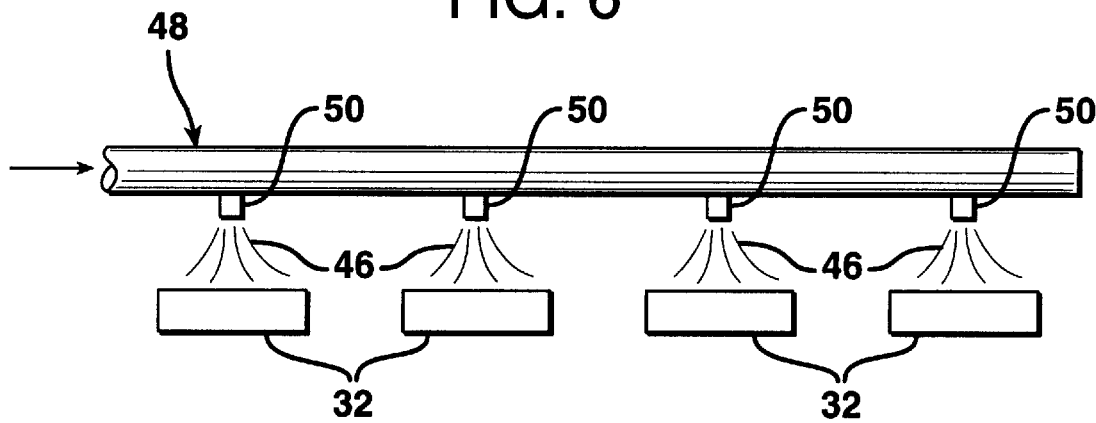
FIG. 6 is a schematic view of a first configuration of multiple adhesive slots and multiple air tips for applying adhesive according to the method of the invention.

A preferred method of applying the adhesive is to extrude the adhesive in the form of ribbons or beads. As shown in FIG. 3, the adhesive applicator 28 includes a nozzle 30 with a slot 32 for extruding molten adhesive 34 in the form of a ribbon 36 on the upper surface 18 of the batt 12. Preferably, the adhesive applicator 28 includes multiple nozzles with multiple slots 32 for extruding ribbons of adhesive, as shown in FIG. 6.

Figure 4:
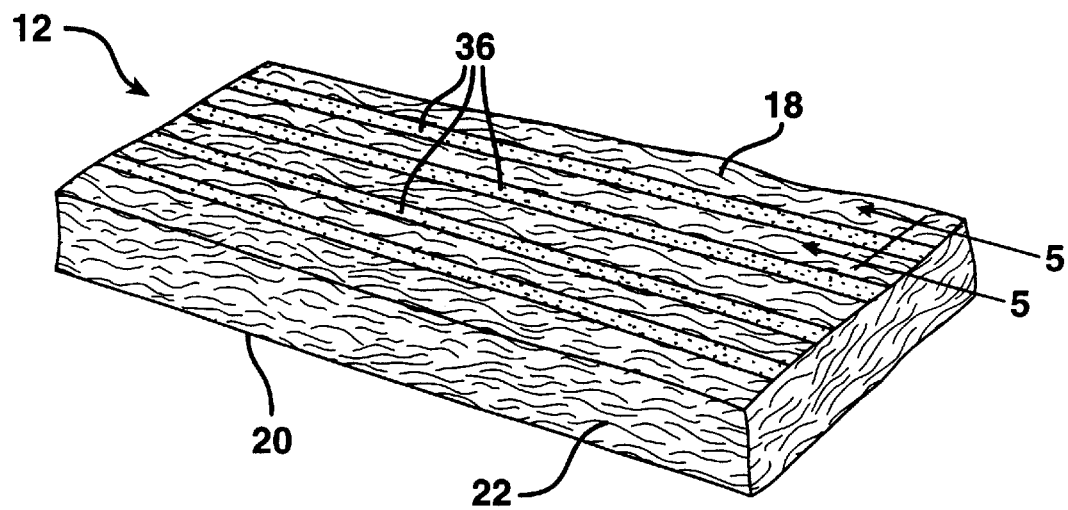
FIG. 4 is a perspective view of the batt of fibrous glass wool with ribbons of adhesive applied on the upper surface.
Figure 5:
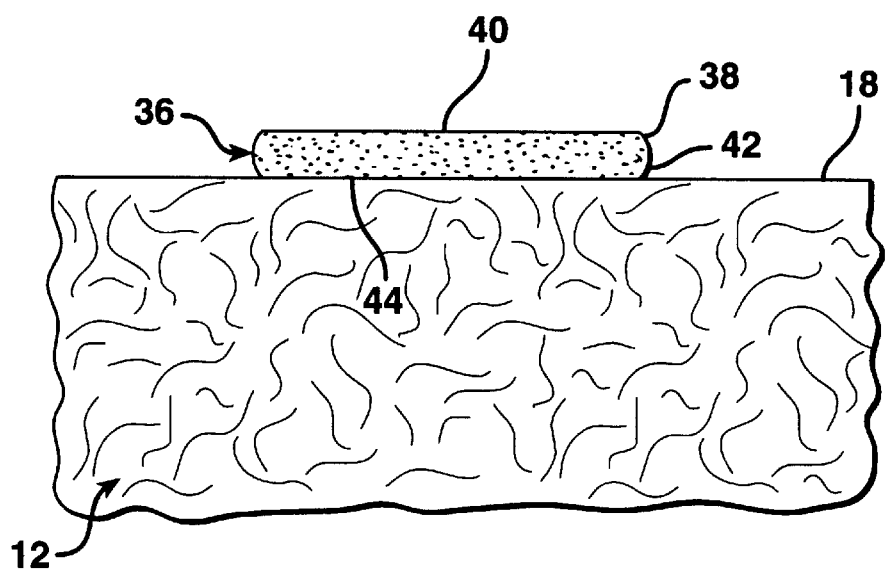
FIG. 5 is a cross-sectional view taken along line 5—5 of FIG. 4, showing a portion of the batt of fibrous glass wool with a ribbon of adhesive applied on the upper surface.

FIGS. 4 and 5 illustrate the batt of fibrous glass wool 12 having ribbons 36 of adhesive applied on the upper surface 18. The ribbons 36 have an upper portion 38 including an upper surface 40 facing away from the batt 12, and a lower portion 42 including a lower surface 44 which contacts the batt 12. The ribbons 36 are usually continuous along the length of the porous substrate, but they can also be stitched to any length. Preferably, the ribbons have a width from about 0.2 inch (0.5 centimeter) to about 2 inches (5.1 centimeters), and a thickness from about 0.004 inch (0.1 millimeter) to about 0.018 inch (0.46 millimeter). Usually, a space from about 0.5 inch (1.3 centimeters) to about 1.5 inches (3.8 centimeters) is left between the ribbons.

As shown in FIG. 5, without additional means to aid penetration, the ribbon 36 of adhesive remains substantially on the upper surface 18 of the batt 12, and does not substantially penetrate the batt. The adhesive adheres only to weakly bound surface fibers and dust, so that the interfacial bond between the adhesive and the fibrous glass wool 12 is weak. (Note that the thickness of the ribbon 36 of adhesive is exaggerated in FIGS. 5 and 8 for purposes of illustration.)

In accordance with the present invention, the bond strength between the adhesive and the porous substrate is improved by impinging the applied adhesive with a fluid. Any suitable gas or liquid can be used for impinging the adhesive. Preferably, the adhesive is impinged with air. The source of the impinging air can be a blower such as an air knife, an air head supplied from a compressed air source, a curtain air transvector, an air jet, a fan, or any other apparatus suitable for impinging the adhesive with air. As shown in FIGS. 3 and 6, the ribbon 36 of adhesive 34 is impinged with air 46 from an air head 48 supplied from a compressed air source (not shown).

Preferably, the impinging air is uniformly distributed on the surface of the adhesive. This helps to form a smooth, continuous, uniform layer of adhesive. The source of the impinging air may include a spray tip (nozzle) for distributing the flow of air. Preferred spray tips are available from Spraying Systems Co., Wheaton, Ill., as VeeJet Nozzles, Type H⅛VV. The spray tips create a flat V-shaped spray pattern with uniform distribution of air throughout the pattern.

Figure 7:
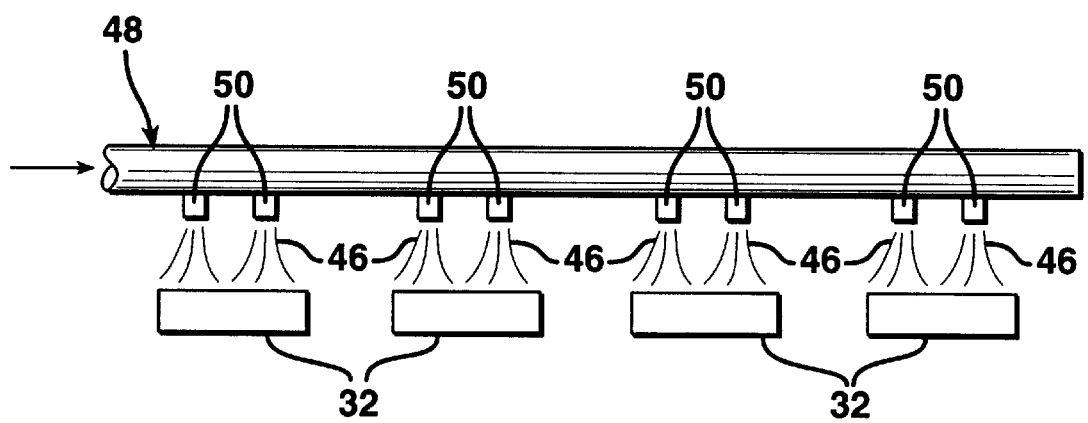
FIG. 7 is a schematic view of a second configuration of multiple adhesive slots and multiple air tips.

When multiple ribbons of adhesive are applied, preferably the source of air includes multiple air heads with spray tips for directly impinging each of the multiple ribbons. As shown in FIG. 6, an elongated air head 48 including multiple air tips 50 can be used for impinging multiple ribbons of adhesive extruded through multiple slots 32 of an adhesive applicator. As shown in FIG. 7, the air head 48 can include two air tips 50 for each extrusion slot 32 for an increased volume of impinging air.

Figure 8:
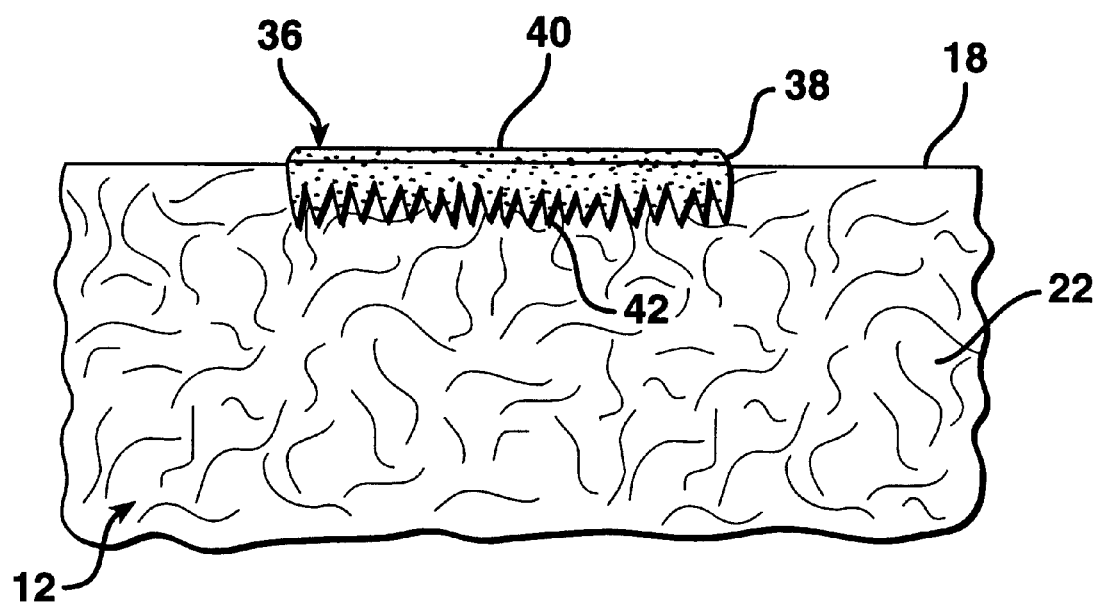
FIG. 8 is a view as in FIG. 5, illustrating the ribbon of adhesive after impingement with air from an air tip.

Impingement of the adhesive with the fluid forces a portion of the adhesive to flow and penetrate the porous substrate. As shown in FIG. 8, impingement of the ribbon 36 of molten adhesive with the air forces the lower portion 42 of the ribbon 36 to flow and penetrate the batt of fibrous glass wool 12. The penetrating adhesive adheres to the more strongly bound fibers in the interior portion 22 of the batt 12 instead of the weakly bound fibers on the upper surface 18. As a result, the interfacial bond between the adhesive and the fibrous glass wool is stronger and well suited for insulation applications.

The distance of penetration of the adhesive to form a strong bond between the adhesive and the porous substrate depends on the density of the substrate, the surface quality of the substrate, and the type of adhesive. When the adhesive is applied in the form of a layer such as a ribbon, preferably the adhesive penetrates a distance into the substrate at least about 20% of the thickness of the layer, and more preferably between about 40% and about 80% of the thickness. In the illustrated embodiment, using light density fibrous glass wool, the lower portion 42 of the ribbon 36 of adhesive penetrates a distance of at least about 0.004 inch (0.1 millimeter) into the batt of fibrous glass wool 12, and usually a distance of from about 0.005 inch (0.13 millimeter) to about 0.01 inch (0.25 millimeters).

The penetration of the adhesive is controlled so that a portion of the adhesive remains on the surface of the porous substrate. This allows the porous substrate to effectively adhere to the surface on which it is installed, such as the housing of a heating or air conditioning unit. As shown in FIG. 8, the upper portion 38 of the ribbon 36 of adhesive remains on the upper surface 18 of the batt 12. The immediate cooling of the molten adhesive from the impinging air forms a "skin" or higher viscosity layer on the upper surface 40 of the adhesive. The lower portion 42 of the ribbon 36 of adhesive remains in a fluid state and penetrates past the upper surface 18 into the interior portion 22 of the batt 12. Thus, impinging the adhesive with air provides a self-regulating mechanism that prevents excessive penetration of the adhesive.

It is important for good adhesion to leave a smooth, continuous layer of adhesive on the surface of the porous substrate. The layer of adhesive should be uniform in coverage along the length of the substrate. As shown in FIG. 8, the upper portion 38 of the ribbon 36 of adhesive forms a substantially smooth, continuous layer of adhesive on the upper surface 18 of the batt 12. A smooth, continuous layer provides the maximum available surface area of adhesive for contact with the surface on which the porous substrate is installed. If insufficient adhesive remains on the surface, the adhesive layer is discontinuous instead of continuous, resulting in poor adhesion. A continuous layer also contributes to good bonding between the adhesive and the porous substrate by bridging any weakly bonded fibers together.

As an indication of a smooth, continuous layer of adhesive, the layer should have a glossy surface appearance. If the layer appears dull, it is an indication that there has been too much penetration of adhesive and/or that insufficient adhesive has been applied.

Extruding or similarly applying the adhesive is preferred over spraying to form a smooth, continuous layer of adhesive. Spraying an adhesive may produce an irregular layer on the porous substrate, resulting in discontinuous point contacts between the substrate and the surface on which it is installed. In contrast, extruding the adhesive provides a smooth, continuous layer for effective adhesion. Extruding a complete layer of adhesive on the porous substrate is effective but more costly than extruding ribbons of adhesive.

Impingement of the adhesive with the air promotes a continuous layer by reducing globbing and skipping of the adhesive and the formation of voids in the adhesive. This function of the impinging air is especially important when applying high viscosity adhesives or when the applied adhesive cannot adequately "wet out" the porous substrate.

The force of the air impinging the adhesive is controlled to cause sufficient penetration of the adhesive for good bonding with the porous substrate, while leaving sufficient adhesive on the surface of the substrate for good adhesion to the surface on which it is installed. Many variables affect the force of impingement, including the velocity and volume of the air, the distance of the source of air from the adhesive, the angle of impingement, and the time of impingement. The force of the impinging air for optimum penetration also depends on the type of porous substrate and the type of adhesive. In general, when the porous substrate is a light density fibrous glass wool and the adhesive is a high viscosity adhesive, preferably the velocity of the air when it impinges the adhesive is at least about 2000 feet/minute (610 meters/minute), and more preferably at least about 3500 feet/minute (1067 meters/minute). Usually, the air velocity is not greater than about 10,000 foot/minute (3050 meters/minute). The velocity of the air can be measured in any suitable manner, for example with a Testoterm 450 meter and Testovent 1C7 wand available Tasto Incorporated, 230 Route 206, Flandars, N.J. 07836. Typically, the vertical distance between the source of the air (e.g., an air tip) and the adhesive is between about ⅜ inch (0.95 centimeter) and about 3 inches (7.6 centimeters) to provide sufficient force of impingement, and to avoid significant cooling of the air if heated air is used. In general, an increased volume of impinging air is more effective in forcing penetration of the adhesive, and more effective in forming a skin on the upper surface of the adhesive to regulate the distance of penetration.

The molten thermoplastic adhesive is in a fluid state when applied on the surface of the porous substrate, but it returns to a solid state when cooled. Preferably, the adhesive is impinged with air substantially immediately after it is applied, so that the adhesive is forced to flow and penetrate the porous substrate while it is still in the fluid state. In a preferred process, the air flow impinges the adhesive as soon as possible after application, for example within about 0.5 seconds after application. As shown in FIG. 6, the air tips 50 are positioned immediately behind the extrusion slots 32. Usually, the air tips are positioned a horizontal distance within about 3–4 inches (7.6–10 centimeters) from the extrusion slots, when the line speed is about 50 feet/minute (15.2 meters/minute).

The temperature of the impinging air is usually between ambient temperature and about 1500° F. (815° C.). The use of heated air extends the "open time" or the time the adhesive remains fluid. Preferably, the air is heated to a temperature from about 300° F. (149° C.) to about 700° F. (371° C.), depending on the rheology of the adhesive and the type of porous substrate. Additional heat can also be applied directly to the applied adhesive by the use of infrared or other heating systems to assist in keeping the adhesive fluid.

Referring again to FIG. 1, a release liner 52 is applied over the adhesive ribbons 36 prior to packaging, to provide a convenient peel and stick insulation product 54. The customer removes the release liner prior to exposing the adhesive for installing the insulation product. The release liner usually comprises a release agent coated on a carrier strip such as Kraft paper, polyethylene-coated paper, film or the like. The release agent can be coated on the carrier strip by any of the well known ways such as by roll coating or rotogravure printing. Any conventional release agent can be used, such as a silicone coat. The release liner may vary in thickness from about 0.0005 inch (0.013 millimeter) to about 0.006 inch (0.15 millimeter) or more.

The insulation product 54 is then conveyed to a roll up machine 56 for packaging the insulation into a roll. The insulation product may also be cut (not shown) into linear batts and packaged. These packages can be standard insulation packages.

The bond strength between the adhesive and the porous substrate is improved compared to products made by traditional methods of applying adhesive. Preferably, the bond strength between the adhesive and a fibrous substrate exceeds the bond strength between the fibers in the interior portion of the substrate. For example, if a ribbon of adhesive is pulled from a batt of fibrous glass wool, the ribbon pulls interior fibers along with it (not just surface fibers).

It should be understood that, although the method for applying adhesive on a porous substrate is disclosed herein as advantageously being used in the production of fibrous insulation products, the method may also be advantageously used for applying adhesive on other types of porous substrates, including plastic foam insulation and any type of porous woven or nonwoven products. Such products may include carpets and various automotive components.

The principle and mode of operation of this invention have been described in its preferred embodiment. However, it should be noted that this invention may be practiced otherwise than as specifically illustrated and described without departing from its scope.

EXAMPLE 1

Experiments were conducted to apply adhesive on a batt of fibrous glass wool according to the method of the present invention. The batt of fibrous glass wool had a density of about 1.5 pounds per cubic foot (24 kilograms/meter$^3$) and a thickness of about ⅝ inch (1.6 centimeters). The batt was fed from a roll onto a conveyor. Pressure sensitive hot melt adhesive was then applied on the upper surface of the batt using hot melt extrusion equipment commercially available from Nordson Corporation, 6755 Jimmy Carter Boulevard, Norcross, Ga. 30071. The adhesive was a high viscosity adhesive (40,000 centipoise at 350° F. [177° C.]) comprised of styrene isoprene block copolymer blended with C-5 feedstock hydrocarbon resin and C-9 reinforcing end block resin. The extrusion equipment had four nozzles, each with a slot 2 inches (5.1 centimeters) wide for extruding continuous ribbons of adhesive on the upper surface of the batt. The slots should be evenly heated to assure the application of ribbons having an even thickness of adhesive. The ribbons of adhesive were 2 inches (5.1 centimeters) wide and about 0.008 inch (0.2 millimeter) thick. The ribbons contained an average of about 2.6 grams of adhesive per foot of ribbon (about 0.8 grams per meter). A space of 1 inch (2.5 centimeters) was left between the ribbons.

Immediately after applying the adhesive, the batt of fibrous glass wool was passed under an air head having air tips for blowing air onto the ribbons of adhesive. The air head was a pipe 28 inches (71 centimeters) long and 1½ inches (3.8 centimeters) in diameter, capped on one end, and connected to a source of pressurized air. The air was at ambient temperature, although heated air is preferred. Holes were drilled in the pipe and air tips were installed. The air tips directed air immediately downstream from each of the four extrusion slots. The air head was positioned approximately 2–3 inches (5.1–7.6 centimeters) above the batt of fibrous glass wool.

Two different air tip configurations were used in the experiments. As shown in FIG. 6, the first configuration used one air tip 50 for each of the extrusion slots 32. The air tip was a VeeJet Nozzle, Type H⅛VV950050 having a slot-shaped nozzle with an equivalent orifice diameter of 0.018 inch (0.45 millimeter). As shown in FIG. 7, the second configuration used two air tips 50 for each of the extrusion slots 32. Each of the air tips was a VeeJet Nozzle, Type H⅛VV8003 having a slot-shaped nozzle with an equivalent orifice diameter of 0.043 inch (1.1 millimeter). The second configuration was preferred. As shown in FIG. 3, the air 46 impinged the ribbon 36 of adhesive 34 with enough force to compress the batt of fibrous glass wool 12 to about one-half its original thickness. A first portion of the adhesive was forced to flow and penetrate a distance of about 0.004 inch (0.1 millimeter) into the batt of fibrous glass wool. As a result, a good interfacial bond was obtained between the adhesive and the fibrous glass wool. A second portion of the adhesive remained as a smooth, continuous ribbon having a glossy appearance on the upper surface of the batt.

EXAMPLE 2

Additional experiments were conducted to apply adhesive on a batt of fibrous glass wool according to the method of the present invention. The batt of fibrous glass wool had ribbons of adhesive about 0.008 inch (0.2 millimeter) thick applied on the upper surface as described in Example 1.

The second configuration of air tips was used to blow air onto the ribbons of adhesive. The air tips were VeeJet Type H⅛VV8003 having a slot-shaped nozzle with an equivalent orifice diameter of 0.043 inch (1.1 millimeter). The air was at ambient temperature. The distance from the air head to the batt of fibrous glass wool was ⅜ inch (0.95 centimeter) in some of the trials and 1¼ inches (3.175 centimeters) in other trials. The pressure of air inside the air head was about 19 psi (1.33 kg/cm$^2$) in some trials, about 31 psi (2.17 kg/cm$^2$) in other trials and about 43 psi (3.01 kg/cm$^2$) in other trials. As in Example 1, the air flow was directed to hit as close behind the extruder nozzle as possible. At the distance of ⅜ inch (0.95 centimeter), the average velocity of the air impinging the ribbon of adhesive (at the upper surface of the ribbon) was 5,725 feet/minute (1,745 meters/minute) at 19 psi (1.33 kg/cm$^2$), 6,675 feet/minute (2,034 meters/minute) at 31 psi (2.17 kg/cm$^2$) and 7,488 feet/minute (2,282 meters/minute) at 43 psi (3.01 kg/cm$^2$). At the distance of 1¼ inches (3.175 centimeters), the average velocity of the air impinging the ribbon of adhesive was 4,350 feet/minute (1,326 meters/minute) at 19 psi (1.33 kg/cm$^2$), 5,156 feet/minute (1,572 meters/minute) at 31 psi (2.17 kg/cm$^2$) and 5,856 feet/minute (1,785 meters/minute) at 43 psi (3.01 kg/cm$^2$). The air impinged the ribbon of adhesive and forced a first portion of the adhesive to flow and penetrate an average distance of approximately 0.004 inch (0.1 millimeter) into the batt of fibrous glass wool. A second portion of the adhesive remained as a smooth, continuous ribbon having a glossy appearance on the upper surface of the batt. All the trials produced acceptable product. The trials where the distance between the air head and the batt was ⅜ inch (0.95 centimeters) produced slightly better penetration of the ribbons into the batt than the trials using a distance of 1¼ inches (3.175 centimeters).

EXAMPLE 3

The following example predicts the results if an additional experiment were conducted to apply adhesive on a batt of fibrous glass wool according to the method of the present invention. Specifically, the batt of fibrous glass wool has ribbons of adhesive about 0.01 inch (0.25 millimeter) thick applied on the upper surface similar to the manner described in Example 1. The air head is a pipe 28 inches (71 centimeters) long and ¾ inch (1.9 centimeter) in diameter, capped on one end, and connected to a source of pressurized air. The first configuration of air tips is used to blow air onto the ribbons of adhesive. The air tips are VeeJet Type H⅛VV950050 having a slot-shaped nozzle with an equivalent orifice diameter of 0.01 8 inch (0.45 millimeter). The air is at ambient temperature. The distance from the air tips to the batt of fibrous glass wool is ⅜ inch (0.95 centimeter) in some of the trials and 1¼ inches (3.175 centimeters) in other trials. The pressure of air inside the air head is about 19 psi (1.33 kg/cm$^2$) in some trials, about 31 psi (2.17 kg/cm$^2$) in other trials and about 43 psi (3.01 kg/cm$^2$) in other trials. As in Example 1, the air flow is directed to hit as close behind the extruder nozzle as possible. At the distance of ⅜ inch (0.95 centimeter), the average velocity of the air impinging the ribbon of adhesive should be 2,000 feet/minute (610 meters/minute) at 19 psi (1.33 kg/cm$^2$), 2,250 feet/minute (686 meters/minute) at 31 psi (2.17 kg/cm$^2$) and 2,525 feet/minute (770 meters/minute) at 43 psi (3.01 kg/cm$^2$). At the distance of 1¼ inches (3.175 centimeters), the average velocity of the air impinging the ribbon of adhesive should be 1,275 feet/minute (389 meters/minute) at 19 psi (1.33 kg/cm$^2$), 1,400 feet/minute (427 meters/minute) at 31 psi (2.17 kg/cm$^2$) and 1,650 feet/minute (503 meters/minute) at 43 psi (3.01 kg/cm$^2$). The air impinges the ribbon of adhesive and forces a first portion of the adhesive to flow and penetrate an effective distance into the batt of fibrous glass wool. A second portion of the adhesive remains as a smooth, continuous ribbon having a glossy appearance on the upper surface of the batt.

We claim:

1. A method for applying adhesive on a porous substrate with improved bonding between the adhesive and the substrate, comprising:

applying the adhesive on one surface of the porous substrate in the form of a layer having a thickness; and then impinging a surface of the adhesive which is opposite to a surface of the adhesive in contact with the substrate surface with a fluid to force a first portion of the adhesive to flow and penetrate the substrate at least about 20% of the thickness of the layer while a second portion of the adhesive remains on the surface.

2. The method according to claim 1 wherein the adhesive is impinged with a gas.

3. The method according to claim 2 wherein the adhesive is impinged with a gas having a temperature of at least about 300° F. (149° C.).

4. The method according to claim 1 wherein the adhesive is impinged such that a skin is formed on an upper surface of the adhesive to control a distance of penetration of the adhesive into the substrate.

5. The method according to claim 1 wherein the adhesive is impinged with the fluid so that the second portion of the adhesive forms a layer of adhesive on the surface having a glossy appearance.

6. The method according to claim 2 wherein the gas impinges the adhesive at a velocity of at least about 2000 feet/minute (610 meters/minute).

7. The method according to claim 1 wherein the porous substrate is low density fibrous glass wool, and wherein the adhesive after setting has a bond strength with the substrate which exceeds a bond strength between interior fibers of the fibrous substrate.

8. The method according to claim 1 wherein the adhesive has a viscosity of at least about 5,000 centipoise at 350° F. (177° C.), and the adhesive is applied by extruding the adhesive.

9. The method according to claim 1 wherein the adhesive is flowable when applied on the surface, and the adhesive is impinged with the fluid within about 0.5 seconds after applying the adhesive.

10. A method for applying adhesive on a porous substrate with improved bonding between the adhesive and the substrate, comprising:

extruding ribbons of the adhesive on one surface of the substrate; and impinging the adhesive with a gas having a temperature of at least about 300° F. (149° C.) to force a first portion of the adhesive to flow and penetrate the substrate while a second portion of the adhesive remains on the surface.

11. The method according to claim 10 wherein the adhesive is impinged with the gas so that the second portion of the adhesive forms a substantially smooth layer of adhesive on the surface.

12. The method according to claim 10 wherein the ribbons are applied with a substantially even thickness of adhesive.

13. The method according to claim 10 wherein the ribbons are applied with a thickness from about 0.004 inch (0.1 millimeter) to about 0.018 inch (0.46 millimeter).

14. The method according to claim 10 wherein the applied ribbons are substantially continuous along each length of ribbon.

15. The method according to claim 10 wherein the applied ribbons have a glossy appearance.

16. The method according to claim 10 wherein the adhesive is impinged such that a skin is formed on an upper surface of the ribbon of adhesive to control a distance of penetration of the adhesive into the substrate.

17. A method for applying adhesive on a fibrous mineral wool substrate to form a strong bond between the adhesive and the substrate, comprising:

applying the adhesive on a surface of the fibrous material wool substrate by extruding ribbons of the adhesive on the surface; and then impinging the adhesive with a fluid directed toward the surface to force with adhesive against the surface, the fluid forcing a first portion of the adhesive to flow and penetrate the substrate while the a second portion of the adhesive remains on the surface, wherein the adhesive after solidifying has a bond strength with the substrate which exceeds a bond strength between interior fibers of the substrate.

18. The method according to claim 17 wherein the adhesive is impinged with a gas.

* * * * *